United States Patent [19]

Cunningham

[11] 4,409,714

[45] Oct. 18, 1983

[54] METHODS OF ASSEMBLING A WICK AND BEARING

[75] Inventor: Eldon R. Cunningham, Fort Wayne, Ind.

[73] Assignee: General Electric Company, Fort Wayne, Ind.

[21] Appl. No.: 294,748

[22] Filed: Aug. 20, 1981

[51] Int. Cl.³ .................... H02K 15/14; B21D 53/10
[52] U.S. Cl. .................... 29/148.4 L; 29/149.5 NM;
29/598; 310/42; 310/90; 384/397; 384/402; 384/413
[58] Field of Search ........... 29/596, 598, 148.4 L, 29/149.5 R, 149.5 NM, 451; 310/90, 42; 384/408–413, 40 L, 397

[56] References Cited

U.S. PATENT DOCUMENTS

| | | | |
|---|---|---|---|
| 3,885,176 | 5/1975 | Cunningham | 310/90 X |
| 3,894,956 | 7/1975 | Whitt | 252/14 |
| 4,055,370 | 10/1977 | Cunningham | 384/413 X |
| 4,102,585 | 7/1978 | Herbenar | 403/138 |

*Primary Examiner*—Carl E. Hall
*Attorney, Agent, or Firm*—Joseph E. Papin

[57] ABSTRACT

In a method of assembling a wick and bearing, the wick is passed into a bore of the bearing through one end thereof, and bridge means on the bearing spanning the bore thereof is captured between bifurcated sections of the wick. In another method of assembling a wick and bearing, wiping sections of the wick are respectively disposed in slots in the bearing intersecting with a bore thereof and a bridge section on the wick is twistably displaced between the wiping sections thereof so as to span across a peripheral portion of the bearing.

14 Claims, 31 Drawing Figures

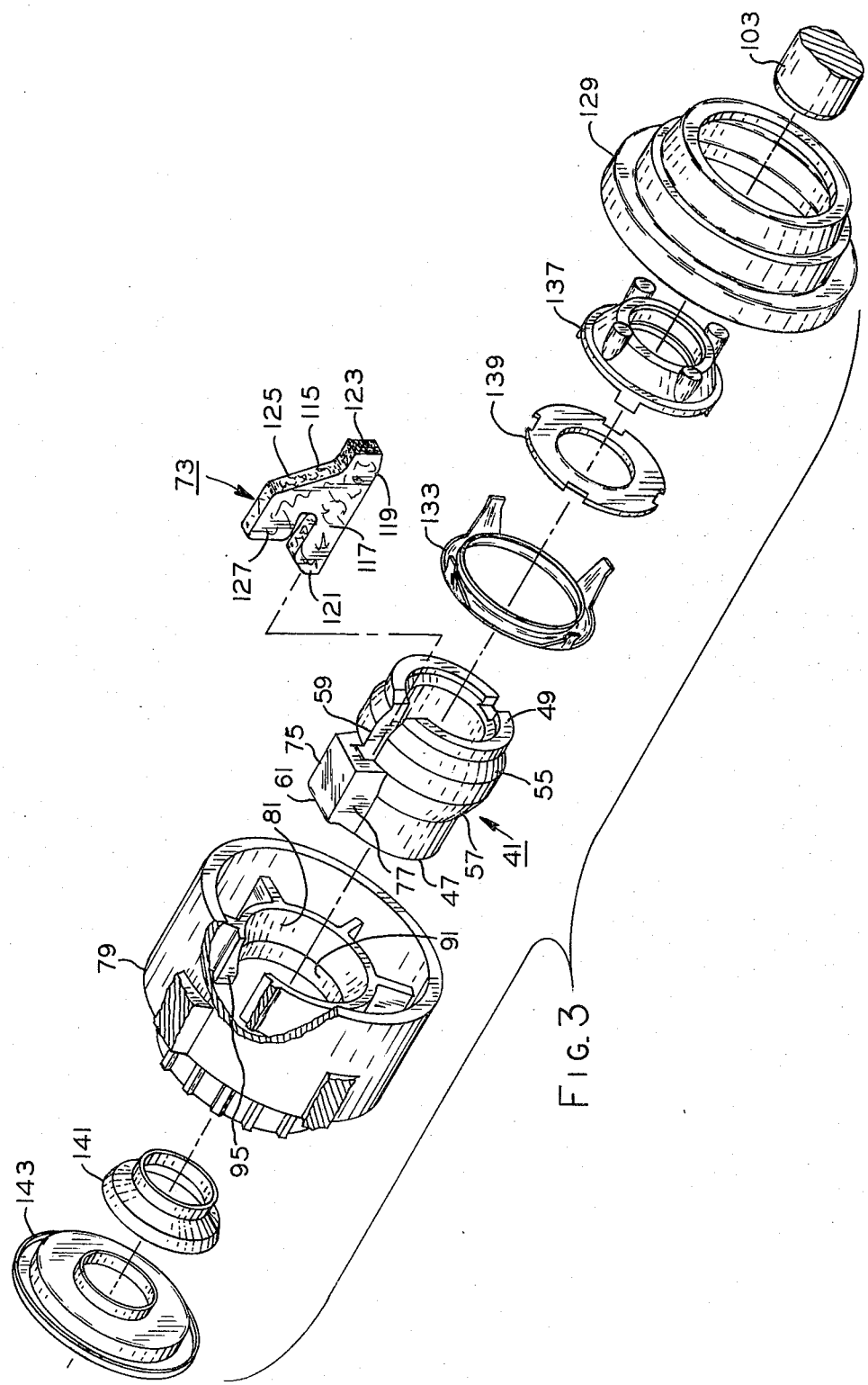

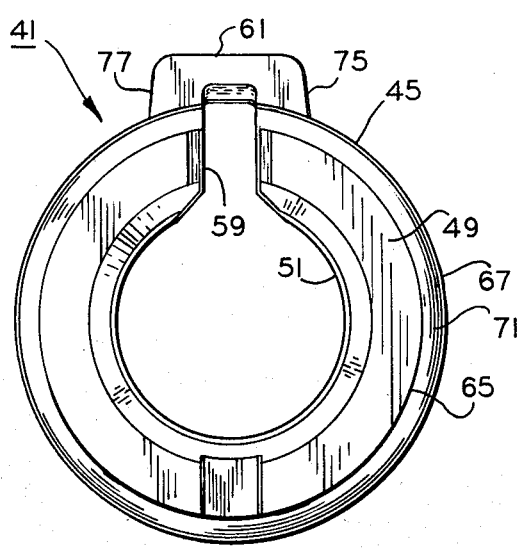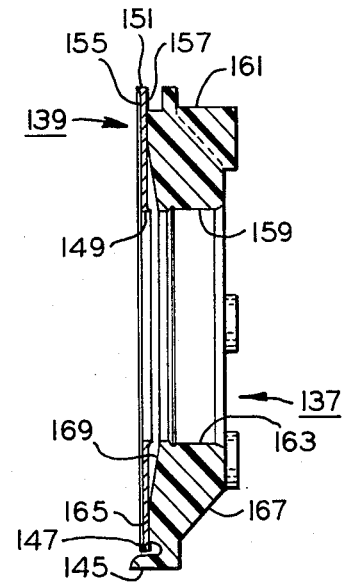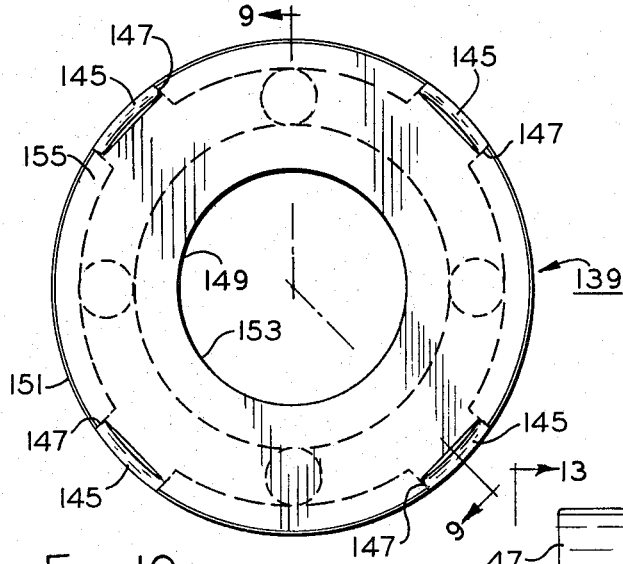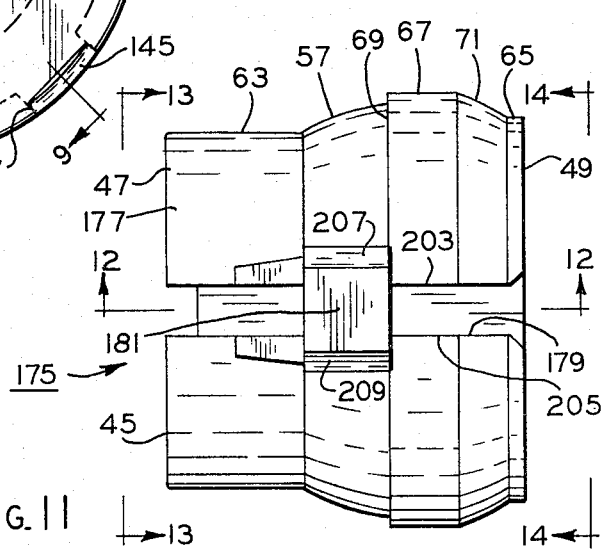

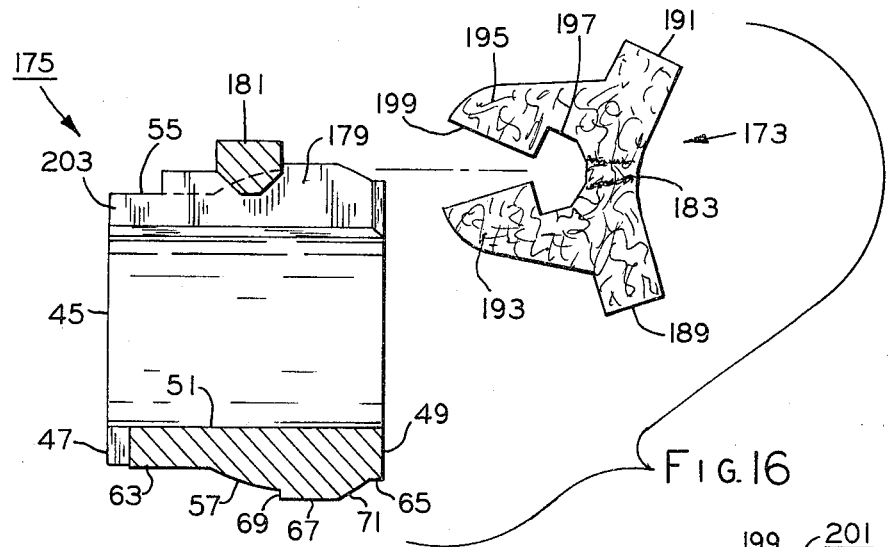
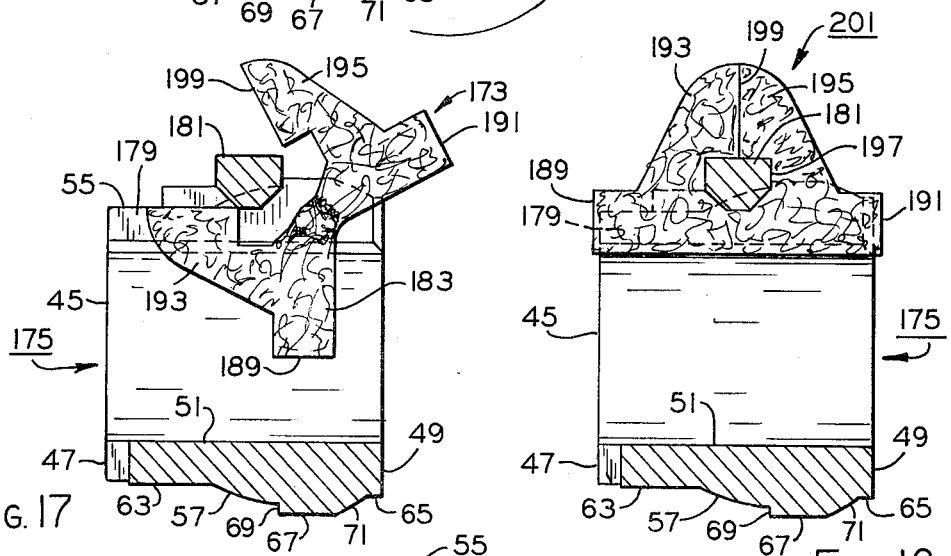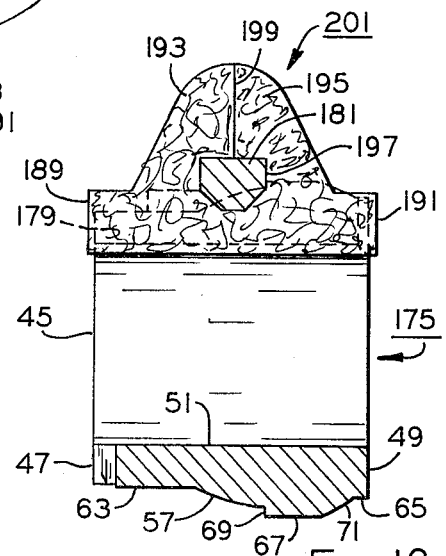
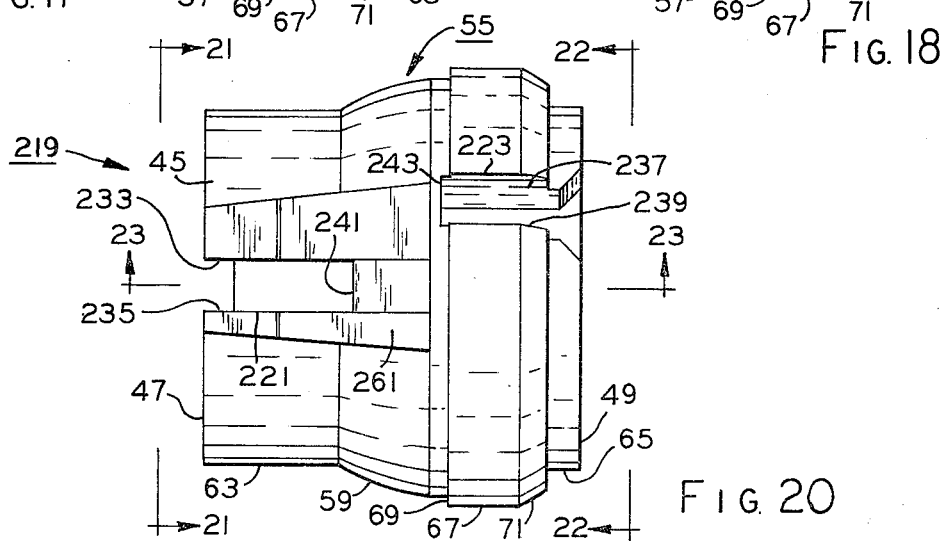

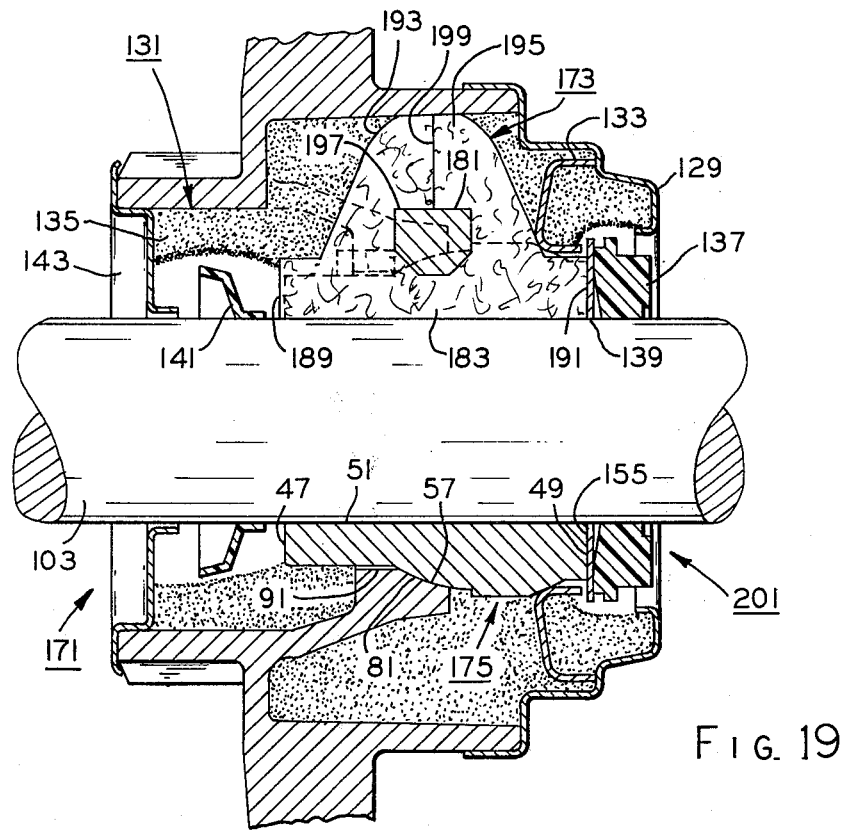
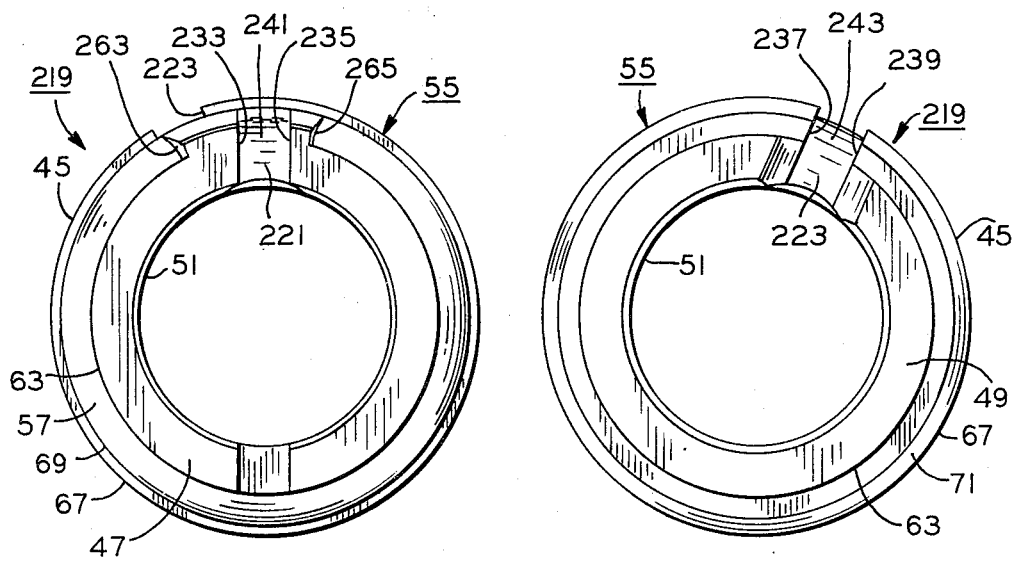
FIG. 19
FIG. 21   FIG. 22

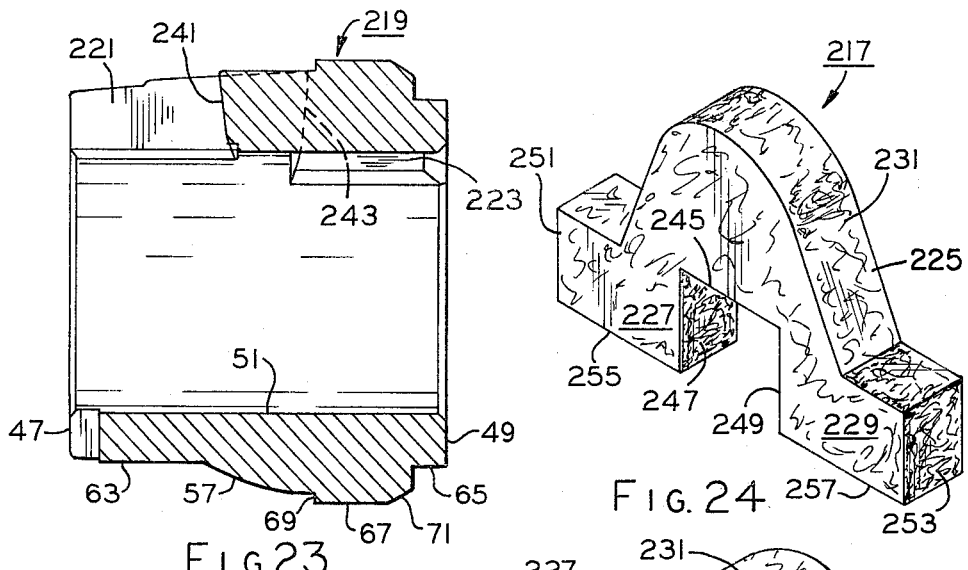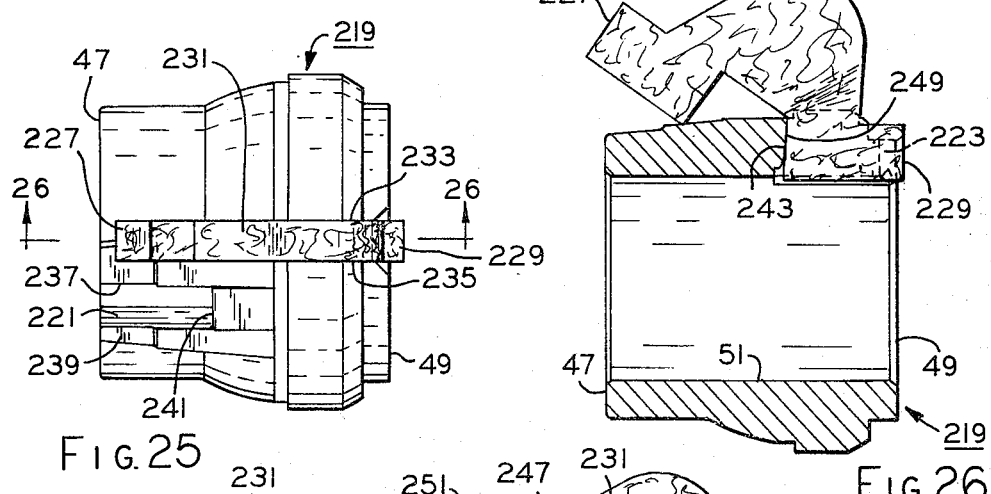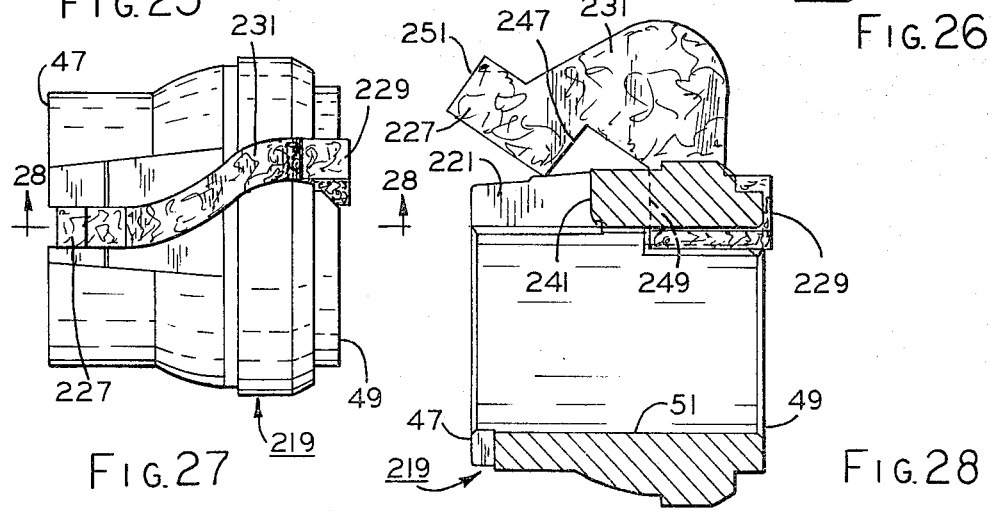

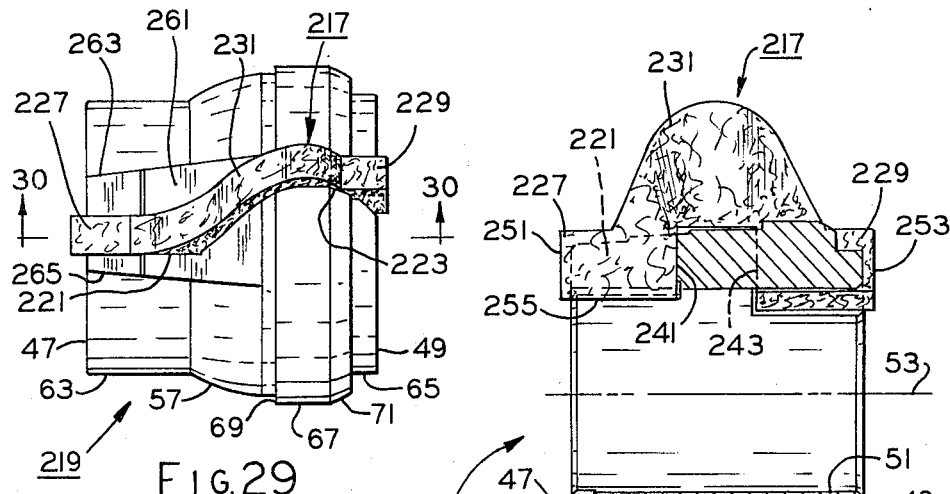
FIG. 29
FIG. 30
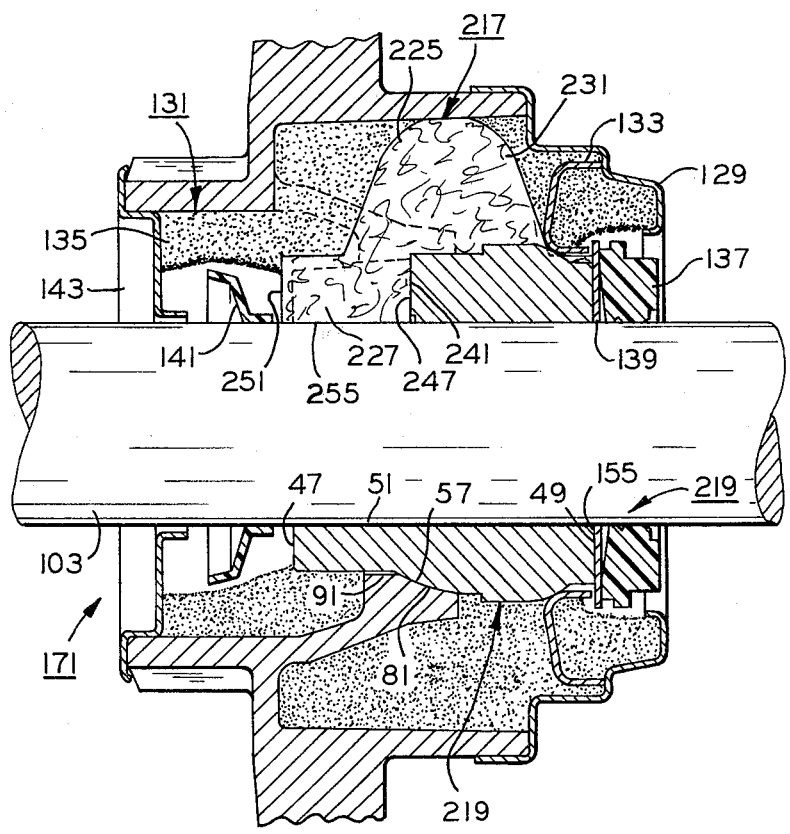
FIG. 31

METHODS OF ASSEMBLING A WICK AND BEARING

FIELD OF THE INVENTION

This invention relates in general to electrical apparatus and in particular to methods of assembling a wick and bearing for use in a dynamoelectric machine.

BACKGROUND OF THE INVENTION

In the past, various different lubrication and bearing systems have been employed in dynamoelectric machines. In at least some of these past systems, an alignable or self-aligning bearing was associated in seating engagement with a dynamoelectric machine structural component, such as an end shield or the like for instance, and such bearing was adjustably seated in different aligning attitudes on the end shield while also arranged in journaling relation with a rotatable assembly of the dynamoelectric machine. These past bearings and end shields were provided with at least partial spherical seating surfaces which were mated together in spherical surface-to-surface seating engagement. It is believed that one of the disadvantageous or undesirable features of the above discussed past systems was the necessity of precision machining both of the at least partial spherical surfaces of the bearing and the end shield within restrictive tolerances in order to obtain the aforementioned spherical surface-to-surface fit in seating engagement therebetween, and of course, it is also believed that such necessary precision machining to both mating at least partial spherical surfaces resulted in an ancillary disadvantageous or undesirable feature, i.e. one of uneconomical manufacture. For instance, when spherical surface-to-surface seating engagement is employed, as discussed above, it is necessary that the at least partial spherical seating surface on the bearing is dimensionally greater than that on the end shield in order to insure the spherical surface-to-surface fit in seating engagement therebetween. Due to this dimensional difference, it is necessary to utilize a wear-in operation wherein the partial spherical seating surface on the bearing is oscillated with a preselected force thereon within the mating partial spherical seating surface in the end shield until the desired spherical surface-to-surface fit in seating engagement is attained therebetween. Thus, it is also believed that the above discussed wearing-in operation is a disadvantageous or undesirable feature which adds cost to the manufacture of a dynamoelectric machine. Further and due to the spherical surface-to-surface fit in seating engagement discussed above, it is belived that another disadvantageous or undesirable feature of the aforementioned past systems was that at least some thereof encountered low wear resistance and/or high breakaway friction unless, of course, some critical bearing material was utilized to at least in part alleviate such disadvantageous feature; however, in the event such critical bearing material was employed, then it is also believed that an ancillary disadvantageous or undesirable feature was encountered, i.e. the relatively higher cost involved in utilizing such critical bearing material.

In the usual past lubrication and bearing system, a lubricating oil was circulated through the lubrication system to effect the lubrication of a dynamoelectric machine shaft rotatably journaled in the bearing. In some others of the past lubrication and bearing systems, a solid additive, such as for instance graphite particles or molysulfide particles or the like, were premixed with the lubricating oil to enhance the lubricity properties thereof. However, another disadvantageous or undesirable feature of the past system employing the premixture of lubricating oil and the solid additive was that such premixture was difficult to utilize within good manufacturing practices. For instance, since the presence of the additive in the premixture is believed to make such premixture dirtier or messier than a plain lubricating oil, any of such premixture escaping from a machine utilized to inject it into the lubrication system of the dynamoelectric machine and/or escaping from such lubrication system during such injection eventually gets on the operator's hands and/or clothing and is difficult to cleanse therefrom.

SUMMARY OF THE INVENTION

Among the several objects of the present invention may be noted the provision of improved methods of assembling a wick and bearing which at least in part overcome the above discussed disadvantageous or undesirable features, as well as others, of the prior art; the provision of such improved assembling methods in which the wick and bearing are positively associated in displacement preventing engagement; and the provision of such improved methods having component parts which are simplistic in design, economically manufactured, and easily assembled. These as well as other objects and advantageous features of the present invention will be in part apparent and in part pointed out hereinafter.

In general, a method in one form of the invention is provided for assembling a unitary lubricant impregnable wick with a bearing. The bearing includes a body having a sidewall defining a bore extending generally axially through the bearing body, slot means through the sidewall for intersecting with the bore along the axial extent thereof, and bridge means on the sidewall for spanning the slot means. The wick includes a wiping section, and a pair of bifurcated sections disposed in angular and spaced relation with respect to the wiping section. In this method, the wick is passed at least in part into the bore through one end thereof, and the bifurcated section is aligned generally on opposite sides of the bridging means. At least a part of the bifurcated sections is moved through the slot means so as to extend beyond the sidewall of the bearing body, and the bridge means is captured in releasable engagement between the bifurcated sections.

Still further in general, a method is provided in one form of the invention for assembling a unitary lubricant impregnable wick and a bearing. The bearing includes a body having a pair of opposite end portions with a generally radially spaced peripheral portion and a journaling surface interposed therebetween, respectively, and a pair of slots are radially spaced apart generally about the journaling surface and extend through the bearing body between the peripheral portion, the journaling surface and the opposite ends thereof, respectively. The wick includes a body having a pair of wiping sections with a bridge section spanning thereacross. In this method, the wiping sections of the wick body are disposed in the slots of the bearing body, respectively, with the bridge section twistably displaced between the wiping sections and spanning therebetween across a part of the peripheral portion of the bearing body, and forces occasioned by the twistable displacement of the bridge sections are imparted onto the wiping sections urging at least a part thereof into gripping engagement with a confronting part of the slots so as to at least oppose displacement of the wiping sections from the slots, respectively.

BRIEF DESCRIPTION OF THE DRAWINGS

FIG. 3 is an enlarged isometric exploded view of the component parts shown in FIG. 2;

FIGS. 5 and 6 are left and right end elevational views of the bearing device of FIG. 4, respectively;

FIG. 9 is an enlarged isolated view of a thrust assembly taken from FIG. 1 showing such thrust assembly in cross-section;

FIG. 10 is a left side elevational view of the thrust assembly of FIG. 9;

FIG. 11 is a top elevational view of an alternative bearing device which may be utilized in the dynamoelectric machine of FIG. 1 in place of the bearing device thereof;

FIGS. 16, 17 and 18 are partial sectional views of the bearing device of FIG. 11 and the wick of FIG. 15 illustrating principles which may be practiced in a method of assembling a wick and bearing in one form of the invention;

FIG. 19 is a sectional view illustrating the assembly of the bearing device of FIG. 11 and the wick of FIG. 15 in the dynamoelectric machine of FIG. 1;

FIG. 20 is a top elevational view of another alternative bearing device;

FIGS. 21 and 22 are left and right side elevational views of the bearing device of FIG. 20;

FIG. 23 is a sectional view taken along line 23—23 of FIG. 20;

FIG. 24 is an isometric view of a wick adapted for use with the bearing device of FIG. 20 in a wick and bearing assembly;

FIGS. 25, 27 and 29 are elevational views of the bearing device of FIG. 20 and the wick of FIG. 24 respectively illustrating principles which may be practiced in a method of assembling a wick and bearing also in one form of the invention;

FIGS. 26, 28 and 30 are sectional views taken along lines 26—26, 28—28 and 30—30 in FIGS. 25, 27 and 29, respectively; and FIG. 31 is a sectional view illustrating the assembly of the bearing device of FIG. 20 and the wick of FIG. 24 in the dynamoelectric machine of FIG. 1.

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention.

DETAILED DESCRIPTION OF THE PREFERRED EMBODIMENTS

Figure 4:
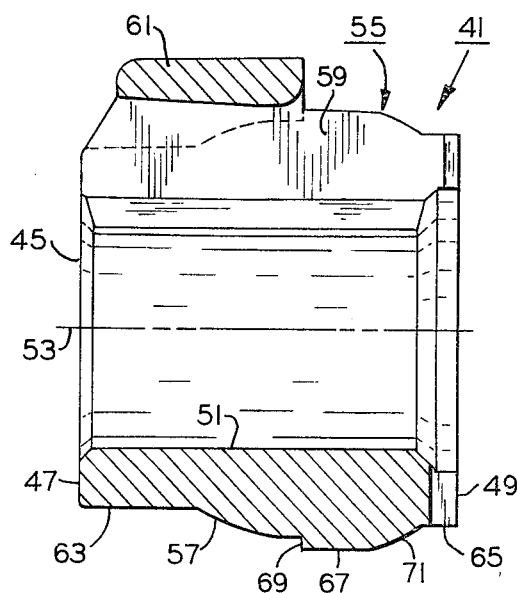
FIG. 4 is an isolated view of a bearing device taken from FIG. 1 illustrated in cross-section.
Figure 5:
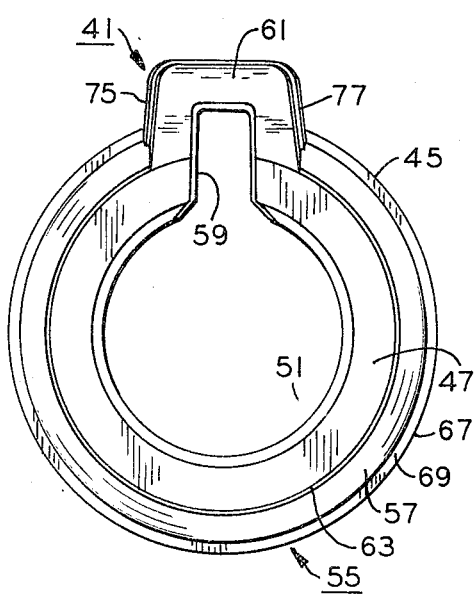

Referring now to the drawings in general, a bearing or bearing device 41 is adapted for use in a dynamoelectric machine 43 (FIGS. 1-6). Bearing device 41 has a body or bearing body 45 with a pair of generally annular radially extending opposite ends or end portions 47, 49, and a bore or generally cylindric journaling surface 51 extends generally axially through the bearing body intersecting with the opposite ends thereof, said bore being generally coaxial about an axis 53 of the bearing body (FIG. 4). A peripheral portion, indicated generally at 55, on bearing body 45 radially outwardly of bore 51 is interposed between opposite ends 47, 49 so as to be generally coaxially arranged about bearing body axis 53, and the peripheral portion includes a partial toroidal surface 57 spaced apart from the opposite ends and also generally coaxial about the bearing body axis (FIGS. 4-6). Slot means, such as an axial slot 59 for instance, is provided in bearing body 45 for intersecting with bore 51, opposite ends 47, 49 thereof and at least a part of peripheral portion 55, and a bridge or bridging means 61 integral with the peripheral portion spans the slot while extending generally axially along at least a part of toroidal surface 57 (FIG. 4).

Figure 2:
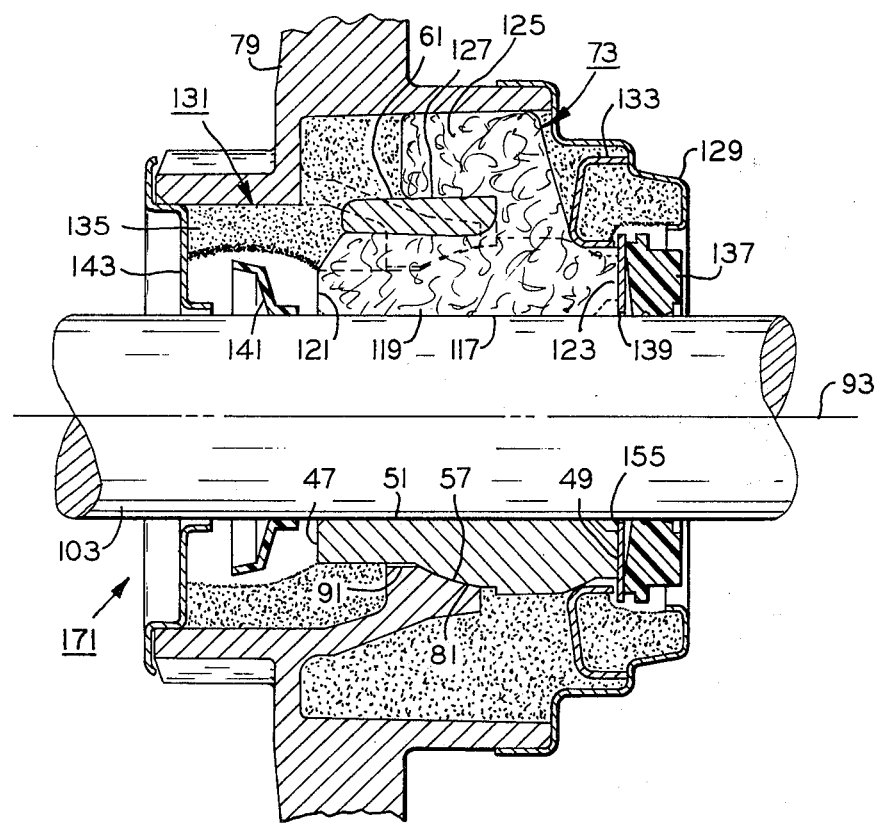
FIG. 2 is an enlarged sectional view taken from FIG. 1 illustrating principles which may be practiced in a method of providing a lubrication system for the dynamoelectric machine.

More particularly and with specific reference to FIGS. 4-6, peripheral portion 55 of bearing body 45 further includes a pair of opposite, generally cylindric end surfaces 63, 65 intersecting with opposite ends 47, 49 of the bearing body and spaced radially outwardly of bore 51 generally coaxially about bearing body axis 53, and cylindric end surface 63 has an axial extent greater than that of cylindric end surface 65. Another or an intermediate generally cylindric surface 67 is also provided on peripheral portion 55 of bearing body 45 generally coaxially about bearing body axis 53 and spaced radially outwardly farther than cylindric end surfaces 63, 65 and partial toroidal surface 57, and a pair of generally annular or radially extending marginal surfaces 69, 71 define the axial extent of the cylindric intermediate surface intersecting therewith and with partial toroidal surface 57 and cylindric end surface 65, respectively. It may be noted that surface 71 is a spherical surface having generally the same centerpoint as a spherical seat in the end shield in which the bearing 41 is received, as discussed in greater detail hereinafter. Thus, partial toroidal surface 57 is both axially and radially spaced between cylindric intermediate surface 67 and cylindric end surface 63 on peripheral portion 55 of bearing body 45. Slot 59 is provided to receive a wick member or feeder 73, as discussed in greater detail hereinafter and as shown in FIGS. 2 and 3, and the slot extends generally axially in bearing body 45 intersecting with bore 51 and opposite ends 47, 49 thereof, respectively. It is believed that the radial depth of slot 59 should be kept to a minimum in order to maximize stiffness of bearing 41 in a radial direction. The depth of slot 59 selected or desired is believed to be that which maintains an acceptable range of contact or wiping pressure between feeder wick 73 and a shaft in wiping engagement therewith over a tolerance range of the wick and slot radial tolerances. It may also be noted that slot 59 also extends generally radially through bearing body 45 so as to intersect with opposite end surface 65, intermediate surface 67 and spherical marginal surface 71 adjacent one axial side of bridge 61 and with opposite end surface 63 adjacent the other axial side of the bridge. Bridge 61 spans or extends across slot 59 radially outwardly of bore 51 in bearing body 45 so as to form a stiffening rib or the like for instance thereacross, and a pair of opposite abutments or gimbaling surfaces 75, 77 are provided on the bridge so as to be spaced from each other generally about bearing body axis 53. It may be noted that a portion of bridge 61 may extend radially outwardly beyond intermediate surface 67 of peripheral portion 55 on bearing body 45, and preferably the bridge extends axially from marginal surface 69 across toroidal surface 57 and at least a part of end surface 63; however, albeit not shown, it is contemplated that the axial extent of the bridge may be greater or less than that shown within the scope of the invention so as to meet at least some of the objects thereof. It may also be noted that bearing body 45 of bearing device 41 is die cast or otherwise formed with only bore 51 being necessarily finished or machined.

Figure 7:
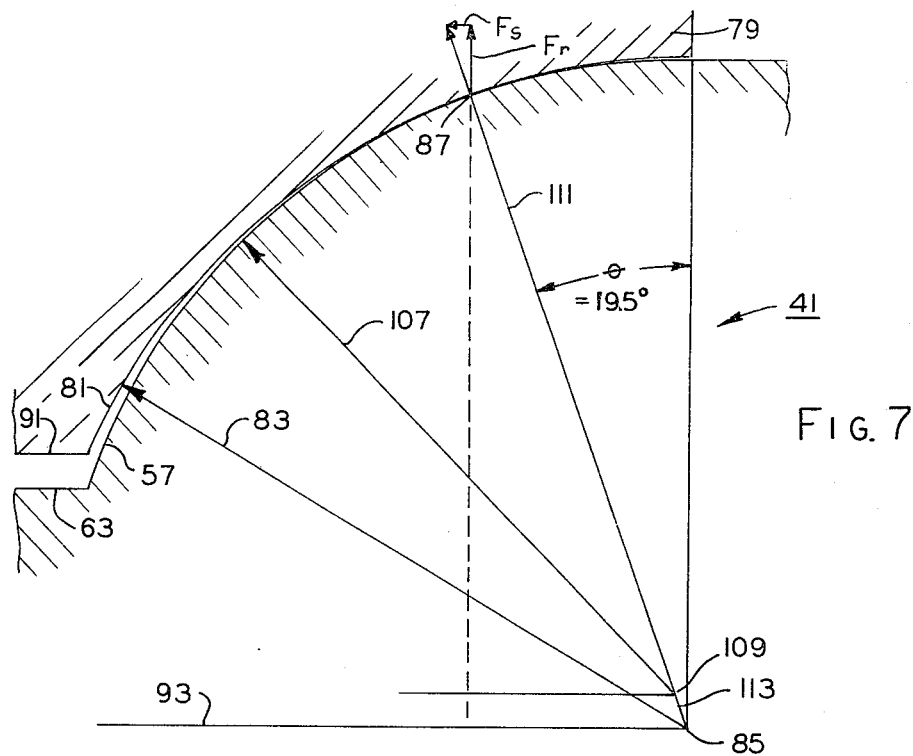
FIGS. 7 and 8 are schematic diagrams illustrating the preselected angular range of the seating engagement between the bearing device and seat provided therefor on a structural component of the dynamoelectric machine, respectively.
Figure 8:
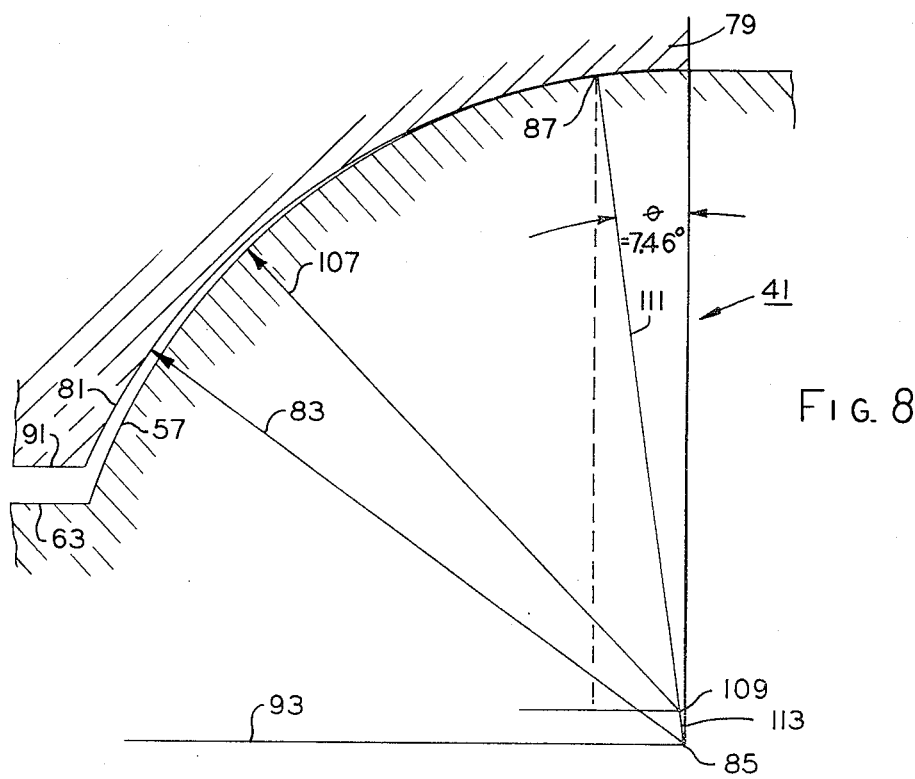

With reference again in general to the drawings and recapitulating at least in part with respect to the foregoing, there is illustrated dynamoelectric machine 43 which, of course, is adapted for energization across a power source (not shown), a structural component, such as an end shield 79 or the like for instance, of the dynamoelectric machine includes a socket defined by partial spherical surface or seating surface 81 having a preselected radius of curvature 83 defining a preselected center of curvature 85 thereof (FIGS. 1-3, 7 and 8). Bearing device 41 is adapted for association in a plurality of aligned or gimbaled attitudes with end shield 79, and partial toroidal surface or seating surface 57 of the bearing device is disposed in seating engagement on partial spherical surface 81 of the end shield with the seating engagement therebetween defining at least a partial circular line of such engagement 87 located within a preselected angular range of the preselected radius 83 of the partial spherical surface in any of the aligned attitudes of the bearing device (FIGS. 7 and 8).

More particularly and with specific reference to FIGS. 1-3, 7 and 8, dynamoelectric machine 43 is provided with another opposite end shield 79a generally of like configuration and having generally the same component parts as end shield 79; therefore, for the purposes of brevity and drawing simplicity, only end shield 79 and its associated lubrication and bearing system is discussed hereinafter. However, it is contemplated that end shield 79a, as well as its associated lubrication and bearing system, may be different than end shield 79 and its associated lubrication and bearing system within the scope of the invention so as to meet at least some of the objects thereof. A generally cylindric shell 89 or the like for instance is interposed between opposite end shields 79, 79a with the opposite end shields and cylindric sheel generally defining a housing of dynamoelectric machine 43; however, it is contemplated that such housing of the dynamoelectric machine may have other forms or be of other configurations within the scope of the invention so as to meet at least some of the objects thereof.

An opening or passage 91 or the like for instance having a preselected axis 93 is provided through end shield 79, and the opening includes partial spherical surface 81 which has its center of curvature 85 coincidental with or laying on the axis of the opening. An axial groove or groove means 95 in end shield 79 intersects with partial spherical surface 81 thereof (as best seen in FIG. 3), and such groove is adapted to receive in rotation preventing and/or gimbaling engagement opposite gimbaling surfaces 75, 77 on bridge 61 of bearing device 41, as discussed in greater detail hereinafter. A stator assembly 97 which may, if desired, comprise a plurality of stacked ferromagnetic laminations, is generally circumferentially encompassed by shell 89 of dynamoelectric machine 43 and predeterminately spaced between opposite end shields 79, 79a thereof, and such stator assembly includes a plurality of winding means, indicated generally at 99, which are adapted for excitation upon the energization of the dynamoelectric machine across the power source (not shown). A rotatable assembly, indicated generally at 101, comprises a shaft 103 having a squirrel cage rotor 105 or the like for instance mounted thereon so as to be conjointly rotatable with the shaft; however, it is contemplated that rotors other than of the squirrel cage type may be utilized with shaft 103 of the rotatable assembly within the scope of the invention so as to meet at least some of the objects thereof. Of course, rotor 105 of rotatable assembly 101 is arranged or otherwise associated in magnetic coupling relation with stator assembly 97 upon the energization of dynamoelectric machine 43, and means, such as bearing device 41 or the like for instance, is associated with end shield 79 and adjustably alignable in the aforementioned attitude plurality thereof with respect to opening 89 for journaling a part, such as shaft 103, of the rotatable assembly.

With reference to FIGS. 7 and 8, it may be noted that partial toroidal surface 57 has a preselected radius 107 defining a center of curvature 109 thereof, and the center of curvature 109 of the partial toroidal surface is coincidental with or lays on a radius line 111 which extends between the center of curvature 85 of partial spherical surface 81 on end shield 79 and the circular line of engagement 87 defined between the partial toroidal surface and the partial spherical surface when seated together. Further, it may also be noted that the center of curvature 109 of partial toroidal surface 57 is radially offset a preselected radial offset distance 113 along radius line 111 from the center of curvature 85 of partial spherical surface 81 within a preselected radial range when the partial toroidal surface and the partial spherical surface are seated in the circular line of engagement 87 within the preselected angular range of preselected radius 83 of the partial spherical surface. Of course, while the circular line of engagement 87 between partial toroidal surface 57 and partial spherical surface 81 is at least theoretically attainable, it is contemplated that such engagement may, in fact, be in the form of a narrow, generally annular or circular band of seating engagement within the scope of the invention so as to meet at least some of the objects thereof. Furthermore, it may be noted that an imaginary plane equidistant between the opposite ends of bore 51 in bearing 41 and perpendicular to axis 53 of the bore passes through the circle of contact 87 between toroidal surface 57 of the bearing and partial spherical surface 81 of end shield 79 so that the resultant of all radial forces acting on bore 51 passes through circle of contact 87. If the resultant of all the radial forces did not pass through circle of contact 87, it is believed that any moment of such radial forces might cause bearing 41 to realign its axis 53 with respect to the axis of shaft 103 which may result in deleterious misalignment.

In order to accommodate all combinations of tolerances encountered with respect to the preselected radius 107 of partial toroidal surface 57 on bearing device 41 and the preselected radius 83 of partial spherical surface 81 on end shield 79, the preselected radius 107 is predeterminately less than the preselected radius 83. In other words, the ratio of the preselected radius 107 to the preselected radius 83 must be less than one in order to ensure that partial toroidal surface 57 on bearing device 41 can always be entered into partial spherical surface 81 on end shield 79 and also to ensure that the circular line of engagement 87 therebetween is in the desired location, i.e. within the preselected angular range of the preselected radius 83 on partial spherical surface 81, for all of the aforementioned combinations of tolerances. Further, it may be noted that the angular location of the circular line of engagement 87 between partial toroidal surface 57 and partial spherical surface 81 is maintained within reasonable limits in order to ensure that the radial load or force Fr exerted on the bearing is as high as possible for a given retentive or spring force Fs on bearing device 41 so as to prevent radial movement of the partial toroidal surface on the partial spherical surface, as discussed in greater detail hereinafter.

As previously mentioned, one of the requirements with respect to the bearing and socket arrangement of dynamoelectric machine 43 is that the circular line of engagement 87 between partial toroidal surface 57 and partial spherical surface 81 must be located within a preselected angular range of the preselected radius 83 for the partial spherical surface, and this relationship is expressed by the following equation:

$$Rs \cos \theta = Rb \cos \theta + OR$$

where:
  Rs = preselected radius 83;
  Rb = preselected radius 107;
  OR = preselected radial offset 113; and
  $\theta$ = the angle of radius line 111.

Another requirement with respect to the bearing and socket arrangement of dynamoelectric machine 43 is that the preselected radius 83 of partial spherical surface 81 be greater than the preselected radius 107 of partial toroidal surface 57. Therefore, in order to accommodate all combinations of tolerances between such preselected radii 83, 107, the minimum preselected radius 83 of the partial spherical surface must be greater than the maximum preselected radius 107 of the partial toroidal surface based, of course, on the tolerances encountered, as previously mentioned. This requirement is expressed by the following equation:

$$Rs \min = Rb \max. + OR \max. + MRC$$

wherein:
  Rs min. = preselected radius 83 at the minimum tolerance thereof;
  Rb max. = preselected radius 107 at the maximum tolerance thereof;
  OR max. = preselected radial offset 113 at the maximum tolerance thereof; and
  MRC = minimum radial clearance between partial spherical surface 83 and partial toroidal surface 107 at $\theta = 0°$.

In an actual bearing and socket arrangement built and tested in dynamoelectric machine 43, preselected radius 107 (Rb) was 0.38876 inches with a tolerance of $\pm 0.00025$ inches, preselected radius 83 (Rs) was 0.55025 inches with a tolerance of $\pm 0.00025$ inches, and the ratio (Rb/Rs) therebetween was 0.705. Preselected radial offset 113 (OR) was 0.15679 inches with a tolerance of $\pm 0.003$ inches, and the minimum radial clearance (MRC) was 0.0012 inches. While the foregoing values were those employed for the above mentioned actual bearing and socket arrangement built and tested in dynamoelectric machine 43, it is, of course, contemplated that various other values may be utilized in other bearing and socket arrangements of various sizes within the scope of the invention so as to meet at least some of the objects thereof. When the foregoing values were employed in the equations set out hereinabove, the preselected angular range ($\theta$ min. and $\theta$ max.) for the above mentioned actual bearing and socket arrangement built and tested in dynamoelectric machine 43 was found to be between about 7 degrees and about 18.3 degrees; however, it is believed that such preselected angular range preferably could be between about 5 degrees and about 30 degrees within the scope of the invention so as to meet at least some of the objects thereof.

Wick 73 may be formed of any desired lubricant impregnable or lubricant transferring wick material, such as a wool, felt or the like for instance, and the wick includes a body 115 having a generally elongate wiping section or portion 117 with a wiping surface 119 interposed between a pair of opposite ends or end portions 121, 123 thereof, and a generally L-shaped placement or gripping section or arm 125 is integrally formed with the wiping section between the opposite ends thereof with a part 127 of the gripping arm being arranged generally in vertically spaced apart relation with the wiping section, as best seen in FIGS. 2 and 3. When assembled with body 45 of bearing device 41, wiping section 117 of wick 73 is inserted or otherwise located in slot 59 of the bearing body so as to extend across the entire axial extent thereof, and at least opposite end 123 of the wiping section extends from the slot past opposite end portion 49 of the bearing body while wiping surface 119 is disposed at least adjacent bore 51 of the bearing body for wiping engagement with shaft 103 of rotatable assembly 101 when it is journaled in the bore. Of course, as wiping section 117 of wick 73 is being assembled into bore 51 of bearing body 41, gripping arm part 127 is passed or otherwise moved over bridge 61 of the bearing body into gripping or at least releasable securing engagement therewith.

With wick 73 and bearing 41 assembled together, the bearing is disposed in opening 91 of end shield 79 with partial toroidal surface 57 of the bearing seated against partial spherical surface 81 of the opening in the manner discussed hereinabove and opposite gimbaling surfaces 75, 77 on bridge 61 of the bearing are received in gimbaling and/or rotation preventing engagement between opposite confronting sidewalls of axial groove 95 in end shield 79. An oil well or reservoir cover 129 is secured to end shield 79 to in part enclose an inboard end of a reservoir 131 provided generally about opening 91, and a spring 133 is biased between the reservoir cover and spherical marginal surface 71 of bearing 41 urging partial toroidal surface 57 thereof toward its seating engagement with partial spherical surface 81 on the end shield. The retentive or spring force Fs exerted by spring 133 on bearing 41 is generally axially directed having a magnitude of about forty pounds, and such spring force is in part determinative of the friction force generated between partial toroidal surface 57 of the bearing and partial spherical surface 81 on end shield 79 in the seating engagement thereof which opposes aligning or adjusting movement of the bearing when arranged in journaling engagement with shaft 103 of rotatable assembly 101, as discussed hereinafter. While force Fs is illustrated as being exerted by spring 133 on bearing 41 and having a magnitude of about forty pounds for purposes of disclosure, it is contemplated that other arrangements may be employed to exert a seating force on the bearing and that such seating force may be of a different magnitude within the scope of the invention so as to meet at least some of the objects thereof. It may also be noted that spring 133 is engaged with feeder wick 73 adjacent opposite end 123 thereof in order to insure contact of this portion of the feeder wick at all times with shaft 103, and the portion of feeder wick 73 adjacent opposite end 121 thereof is urged into such contact with the shaft by the interfering fit thereof with bridge 61 for instance.

A lubricant storage wick material 135 may be packed by an operator or otherwise placed or extruded by suitable means (not shown) into reservoir 131 of end shield 79 so as to be associated in lubricant transfer relation with arm part 125 of feeder wick 73 assembled with bearing 41 in the end shield, as discussed above. Lubricant storage wick material 135 may be G.E. Lube available from the General Electric Company, Fort Wayne, Ind., and if a more detailed discussion of the lubricant storage wick material is desired, reference may be had to U.S. Pat. No. 3,894,956 issued to James A. Whitt on July 15, 1975 which is incorporated herein by reference; however, it is contemplated that other lubricant storage wicking materials may be utilized within the scope of the invention so as to meet the objects thereof.

Upon the assembly of dynamoelectric machine 43, thrust transferring means, such as a thrust collar 137 and thrust plate 139, are axially located on shaft 103 of rotatable assembly 101 and secured thereto so as to be conjointly rotatable therewith. Shaft 103 is inserted or otherwise moved through bore 51 of bearing 41 into journaling engagement therewith, and thrust plate 139 is disposed in thrust transferring relation with inboard end 49 of bearing 41, as discussed in greater detail hereinafter. It may be noted that thrust collar 137 which is secured to shaft 103 is disposed in oil slinging relation with respect to a part of lubricant storage wick material 135 in end shield reservoir 131. With shaft 103 so inserted through bore 51 of bearing 41, end shield 79 may be secured by suitable means (not shown) to a confronting end of shell 89 thereby to enclose stator assembly 97 and rotor 105 within the shell, and an oil slinger 141 is pressed or otherwise secured onto the shaft adjacent outboard end 47 of the bearing in lubricant or oil slinging relation with a part of lubricant storage wick material 135 in end shield reservoir 131. To conclude the assembly of dynamoelectric machine 43, an end cap or closure member 143 is secured to end shield 79 and extends about the exterior end of shaft 101 so as to enclose reservoir 131 of the end shield thereby to oppose the entry of foreign particles into the end shield reservoir. Thus, with the component parts of dynamoelectric machine 43 so assembled, it may be noted that the gimbaling relation or engagement of opposite gimbaling surfaces 74, 77 on bridge 61 of bearing 41 within axial groove 95 of end shield 79, as previously mentioned, assures the positioning or self-aligning of the bearing in an attitude which coaxially arranges bore 51 of the bearing in journaling engagement or association with shaft 103 of rotatable assembly 101.

Figure 1:
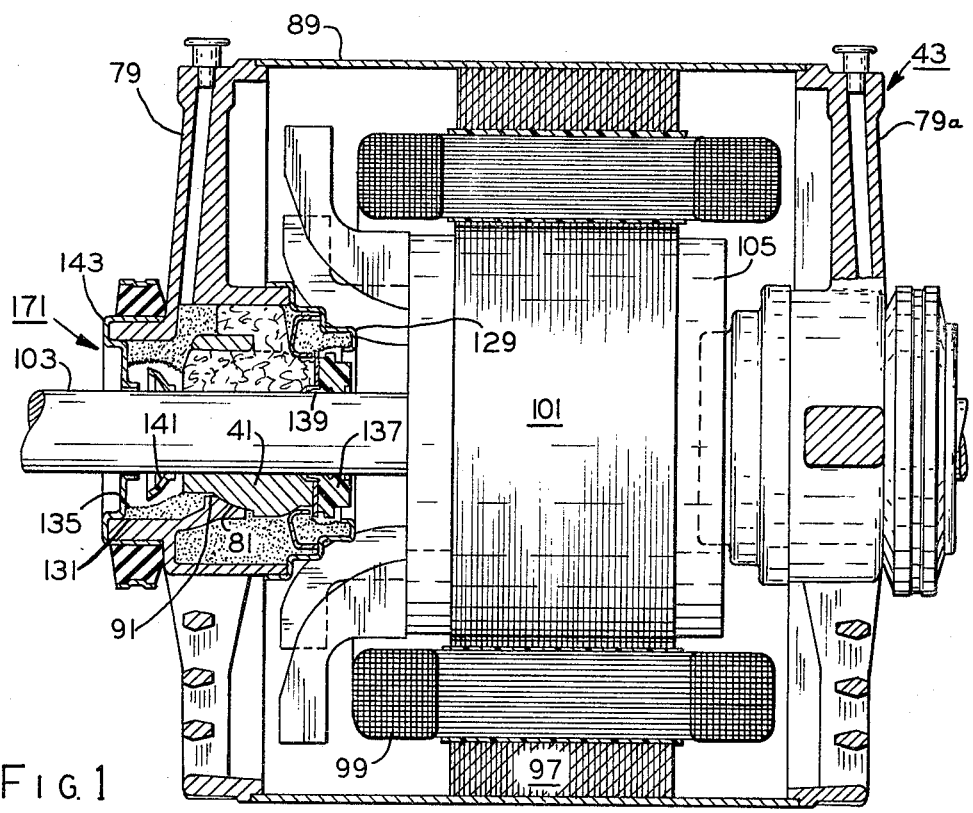
FIG. 1 is a sectional view illustrating in cross-section a dynamoelectric machine.

With reference again in general to the drawings and recapitulating at least in part with respect to the foregoing, dynamoelectric machine 43 has end shield 79, rotatable assembly 101, and a bearing device, such as bearing device 41 discussed hereinabove for instance, is associated with the end shield and adapted for journaling engagement with the rotatable assembly (FIGS. 1-3). A pair of means, such as thrust collar 137 and thrust plate 139 for instance, are conjointly rotatable with rotatable assembly 101 and operable generally for transmitting axially directed thrust of the rotatable assembly occasioned upon the rotation thereof to a part of bearing device 41, such as opposite end or thrust surface 49 thereof for instance (FIGS. 1-3, 9 and 10). Transferring means or thrust collar 137 is secured to rotatable assembly 101 while transferring means or thrust plate 139 is arranged to engage opposite end 49 of bearing device 41 to effect the transfer thereto of the axially directed thrust of the rotatable assembly, and the thrust collar and thrust plate include a plurality of means, such as a plurality of gripping fingers 145 and a plurality of notches 147 or the like for instance, for releasable connection therebetween, respectively (FIGS. 3, 9 and 10).

More particularly and with specific reference to FIGS. 1-3, 9 and 10, thrust plate 139 may, if desired, be formed from a hardened spring steel, such as AISI 1075 for instance, so as to provide adequate wear resistance when running against bearing device opposite or inboard end 49 in thrust transferring engagement therewith, as discussed hereinafter. A pair of generally radially spaced inner and outer peripheral portions or surfaces 149, 151 are provided on thrust plate 139 with inner peripheral surface defining as generally axially extending opening 153 therethrough which is disposed about shaft 103 of rotatable assembly 101 when the thrust plate and thrust collar 137 are assembled therewith in dynamoelectric machine 43, and a pair of generally annular opposite faces or surfaces 155, 157 are axially spaced apart on the thrust plate intersection with the inner and outer peripheral surfaces, respectively, with face 155 being arranged or spaced at least adjacent bearing device end 49 in thrust transferring relation therewith and in lubricating relation with opposite end 123 of feeder wick 73. Recesses or notches 147 are spaced about outer peripheral surface 151 of thrust plate 139 extending thereinto with such notches comprising the aforementioned connection means of the thrust plate. While thrust plate 139 is illustrated herein as being formed of hardened spring steel and having the particular shape discussed above for purposes of disclosure, it is contemplated that other thrust plates formed of other material and/or having other different shapes may be utilized in dynamoelectric machine 43 within the scope of the invention so as to meet at least some of the objects thereof.

Thrust collar 137 may, if desired, be molded or otherwise formed of a plastic material, such as a nylon or the like for instance, and also if desired, a filler material, such as for instance glass fibers or the like, may be added to such plastic material for strengthening or stiffening purposes. A pair of generally radially spaced inner and outer peripheral portions or surfaces 159, 161 are provided on thrust collar 137 with the inner peripheral surface defining a generally axial opening 163 therethrough, and the opening is secured in displacement preventing engagement about shaft 103 of rotatable assembly 101 when the thrust collar is axially located thereon, as mentioned hereinabove. A pair of generally annular faces 165, 167 are generally axially spaced apart on thrust collar 137 being interposed between inner and outer peripheral surfaces 159, 161 so as to intersect therewith, respectively, and it may be noted a part of face 165 is relieved at 169 so as to be arranged in a preselected angular relation in order to accommodate any axial deflection of thrust plate 139 which may occur upon the thrust transferring engagement thereof with bearing device end 49. Gripping fingers 145 are integrally formed on thrust collar 137 at least adjacent outer peripheral surface 161 thereof and extend generally axially past face 165 of the thrust collar, the gripping fingers comprising the aforementioned releasable connection means of the thrust collar. It may be noted that gripping fingers 145 have a preselected degree of resiliency inherent to the plastic material from which thrust collar 137 is formed wherein the gripping fingers are respectively received in resilient gripping or releasable connection with confronting ones of notches 147 of thrust plate 139. When thrust collar 137 and thrust plate 139 are assembled together with the thrust collar located and secured on shaft 103 of rotatable assembly 101, it may be noted that the engagement of gripping fingers 145 within notches 147 of thrust plate 139 effects the conjoint rotation thereof with the thrust collar and rotatable assembly upon the energization of dynamoelectric machine. Further, it may also be noted that the axial thrust of rotatable assembly 103 occasioned upon the rotation thereof is transferred from thrust collar 137 to thrust plate 139 through the abutting engagement of opposed faces 157, 165 thereof, respectively, and such axial thrust is transferred to bearing device 41 through the running engagement of face 155 on the thrust plate with inboard end 49 of the bearing device.

Referring again to the drawings in general and recapitulating at least in part with respect to the foregoing, there is illustrated a method of providing or establishing and operating a lubrication and bearing system, indicated generally at 171, for shaft 103 of dynamoelectric machine 43 to assure adequate shaft lubrication particularly during a run-in operation of the dynamoelectric machine when it is first energized and with the dynamoelectric machine having means, such as bearing device 41 or the like for instance, for journaling the shaft (FIGS. 1–3). In this method, shaft 103 is lubricated only with a solid lubricant, such as minute graphite particles or molysulfide particles or the like for instance (not shown), impregnated or otherwise associated with feeder wick 73 during at least a part of the run-in operation of dynamoelectric machine 43 when it is first energized, and a mixture of a lubricating oil and the solid lubricant is created or otherwise established to effect the lubrication of the shaft by passing or otherwise flowing the lubricating oil from storage wick material 135 through the feeder wick in response to the rotation of the shaft in bearing device 41 when the dynamoelectric machine is energized (FIGS. 1 and 2). The mixture is circulated or otherwise flowed through lubrication and bearing system 171 to effect continuing lubrication of shaft 103 during the energization of dynamoelectric machine 43 (FIGS. 1 and 2).

More particularly and with specific reference to FIGS. 1–3, feeder wick 73 may be impregnated with the aforementioned solid lubricant by suitable means (not shown), and the impregnated feeder wick is assembled with bearing device 41 in wiping engagement with shaft 103 of rotatable assembly 101 upon the assembly of dynamoelectric machine 43, as previously discussed. Thus, when bearing device 41 is assembled with end shield 79, arm part 129 of impregnated feeder wick 73 is communicated or otherwise disposed so as to be associated with reservoir 131 of lubrication and bearing system 171 associated with end shield 79, and storage wick material 137 which contains lubricating oil is placed in the reservoir in communication or lubricating oil transfer relation with at least the arm part of the impregnated feeder wick.

When dynamoelectric machine 43 is initially connected across a power source (not shown) therefor, winding means 99 of stator assembly 97 is excited, and since rotatable assembly 101 is arranged in magnetic coupling relation with the stator assembly, current induced into the rotatable assembly effects the rotation thereof with shaft 103 being journaled or otherwise rotatably supported in bearing device 41 of lubrication and bearing system 171 associated with end shield 79. Of course, this rotation of rotatable assembly 101 upon the energization of dynamoelectric machine 43 creates side or rotational loading force Fr on bearing device 41 which, when vectorially coupled with the aforementioned retaining force exerted on the bearing device by spring 33, defines the resultant force between partial toroidal surface 57 of the bearing device and partial spherical surface 81 of end shield 79. Further, it is believed that other radial loads may be applied externally to shaft 103, such as by belt tension or loading or the like for instance, and such other radial loads may account for a generally greater part of the total radial loading force Fr in the bearing device.

When dynamoelectric machine 43 is first energized, as discussed above, during its initial run-in operation, shaft 103 may be initially lubricated only by the solid lubricant of impregnated feeder wick 73 in its wiping engagement with the shaft during at least a part of such initial run-in operation of the dynamoelectric machine 43. The rotation of shaft 103 in its journaled association within bearing device 41 effects or otherwise establishes or draws a flow of the lubricating oil from storage wick material 135 in reservoir 131 of lubricating and bearing system 171 through impregnated feeder wick 73 mounted in slot 59 of the bearing device into bore 51 thereof and into lubricating communication with the shaft in its journaled engagement within the bore. Of course, as the lubricating oil is flowed or otherwise drawn from storage wick material 135 in reservoir 131 through impregnated feeder wick 73 at least some of the solid lubricant of the impregnated feeder wick is released or otherwise transferred therefrom into the lubricating oil flow passing through the feeder wick thereby to form a lubricating mixture of the lubricating oil and the solid lubricant. Thus, it may be noted that the solid lubricant carried by impregnated feeder wick 73 is present in the wiping engagement thereof with shaft 103 to ensure adequate lubrication of the shaft during at least a part of the initial run-in operation of dynamoelectric machine 43, and thereafter, the solid lubricant captured in the flow of lubricating oil from storage wick material 135 through the impregnated feeder wick enhances the lubrication of the shaft during continued or subsequent energization of the dynamoelectric machine. Of course, the lubricating mixture so formed, as discussed above, flows through bearing device 41 between bore 51 thereof and shaft 103 forming a hydrodynamic film therebetween and toward slinger 141 on the shaft, and when the flow of the lubricating mixture along the shaft is intercepted by the slinger, the conjoint rotation of the slinger with the shaft throws or slings the lubrication mixture generally radially outwardly of the shaft into contact with a part of storage wick material 135 disposed in reservoir 131 generally in radially spaced relation with both the slinger and thrust plate 139, respectively. The lubricating mixture so displaced from slinger 141 is captured or recaptured by storage wick material 135, and the capatured lubricating mixture is circulated or recirculated through lubrication and bearing system 171 generally in the same manner as discussed above to at least in part effect further release of the solid lubricant thereinto from impregnated feeder wick 73 as such lubricating mixture passes therethrough. Of course, circulation or recirculation of the lubrication mixture through lubrication and bearing system 171 is continuous or continued to effect the lubrication of shaft 101 in bore 51 of bearing device 41 so long as dynamoelectric machine 43 is energized subsequent to the initial run-in operation thereof. Although the impregnation of feeder wick 73 with the solid lubricants positively assures the lubrication of shaft 103 at least during the initial run-in operation of dynamoelectric machine 43, as discussed above, it is believed that lubrication and bearing system 171 in which such solid lubricant was not employed could also be utilized to effect the lubrication of shaft 103 within the scope of the invention so as to meet at least some of the objects thereof.

An alternative method of assembling a lubricant impregnable feeder wick 173 with a bearing or bearing device 175 in one form of the invention is illustrated in FIGS. 11-18 with feeder wick 173 and bearing 175, respectively, having generally the same components operating generally in the same manner in dynamoelectric machine 43 as the previously described feeder wick 73 and bearing 41 with the exceptions discussed hereinafter. While this alternative method of assembling feeder wick 173 and bearing 175 meets at least some of the objects set out herein, it is believed that such alternative method has indigenous objects as will be in part apparent and in part pointed out in the following discussion.

Figure 15:
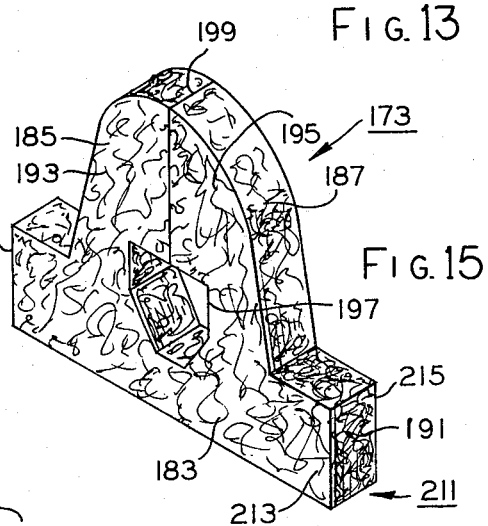
FIG. 15 is an isometric view of a wick adapted for use with the bearing device of FIG. 11 in a wick and bearing assembly.

Referring again to the drawings in general with respect to the alternative method and recapitulating at least in part with respect to the foregoing, bearing 175 includes a generally annular sidewall 177 defining bore 51 therein and peripheral portion 55, a slot or slot means 179 extending through the sidewall for intersecting with the bore along the entire axial extent thereof, and a bridge or bridge means 181 on sidewall 177 for spanning slot 179 (FIGS. 11-18). Wick 173 includes a wiping section 183, and a pair of bifurcated sections 185, 187 are disposed in angular and spaced relation with respect to the wiping section (FIG. 15). In this method, wick 173 is passed or otherwise moved or inserted at least in part into bore 51 through or past one of ends 47, 49 of bearing 175 (FIGS. 16 and 17). Bifurcated sections 185, 187 of wick 173 are aligned or otherwise arranged to located generally on opposite sides of bridge 181 (FIGS. 17 and 18). At least a part of bifurcated sections 185, 187 are moved or otherwise inserted or guided through slot 179 so as to extend in part beyond sidewall 177 of bearing body 45, and bridge 181 is captured or otherwise arranged or associated in releasable engagement between the bifurcated sections (FIG. 18).

More particularly and with specific reference to FIGS. 11-18, wiping section 183 of wick 173 has a pair of opposite ends or end portions 189, 191 thereon, and bifurcated sections 185, 187 include a pair of spreadable fingers 193, 195 disposed generally in side-by-side relation so as to extend generally perpendicular with respect to the wiping section. Bifurcated sections 185, 187 respectively define an opening 197 through wick 173 which is in part at least adjacent wiping section 183 thereof, and a passage 199 arranged between fingers 193, 195 of the bifurcated sections intersects with the opening. When wick 173 is assembled with bearing 175, fingers 193, 195 of the wick are initially spread apart or otherwise separated thereby to open passage 199 between the fingers. When passage 199 is so opened, it is aligned or otherwise generally positioned with respect to slot 179 adjacent opposite end 49 of bearing body 45, and the opened passage is moved into the slot from or past the opposite end of the bearing body. Upon the passage of wick 173 into slot 179, finger 193 and opposite end portion 189 of wiping section 183 is entered into bore 51 through or past end 49 of bearing body 45, and finger 195 is passed or otherwise disposed adjacent peripheral surface 55 of the bearing body and at least adjacent bridge 181. Finger 193 is thereafter guided or otherwise led from or through bore 51 of bearing 175 into slot 179 between bridge 181 and opposite end 47 of the bearing. With finger 193 so entered into slot 179, wick 173 is turned or otherwise twisted or rotated at least in part in the slot about bridge 181 to dispose or otherwise arrange or position opening 197 in the wick at least in part adjacent or about the bridge and to locate wiping section 183 of the wick in the slot at least adjacent bore 51 with opposite end portions 189, 191 of the wiping section extending at least adjacent or axially beyond opposite ends 47, 49 of the bearing, respectively. Thus, generally as wiping section 183 of wick 173 is located in slot 179 of bearing 175, fingers 193, 195 of the wick are returned or otherwise repositioned toward the side-by-side relation thereof at least in part beyond peripheral surface 55 of the bearing so as to generally close passage 199 between the fingers and capture within opening 197 of the wick in releasable engagement therewith at least a part of bridge 181. While finger 193 and opposite end portion 189 on wiping section 183 of wick 173 have been illustrated and discussed herein as being entered into bore 51 of bearing 175 through or from end 49 thereof to initiate the assembling method as discussed hereinabove for purposes of disclosure, it is, of course, contemplated that such assembly method could be reversed with finger 95 and opposite end portion 191 of the wick being entered into the bore of the bearing through or from end 47 thereof within the scope of the invention so as to meet at least some of the objects thereof.

Figure 12:
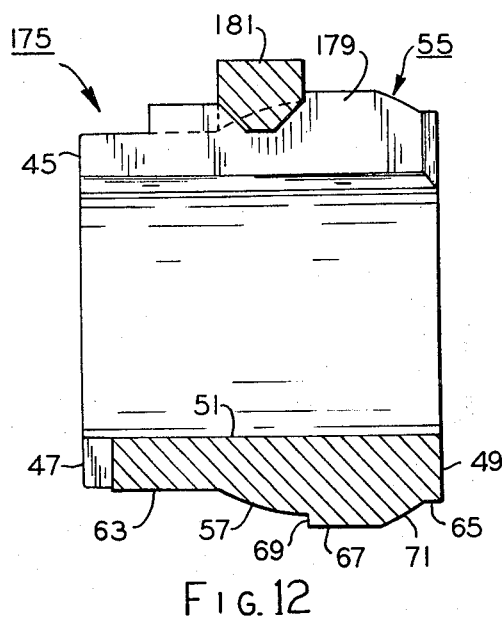
FIG. 12 is a sectional view taken along line 12—12 of FIG. 11.
Figure 13:
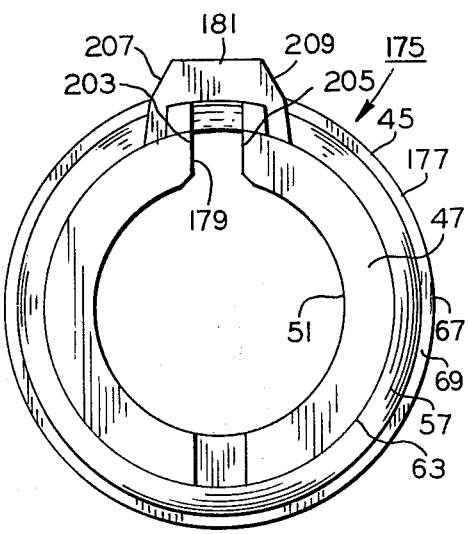
FIGS. 13 and 14 are left and right side elevational views of the bearing device of FIG. 11, respectively.
Figure 14:
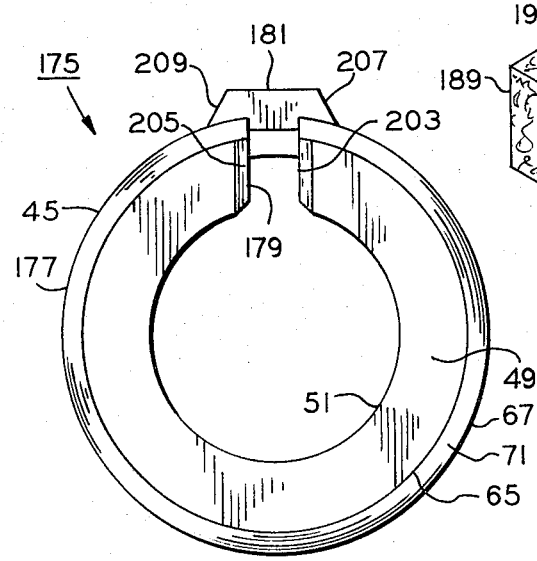

With reference again in general to the drawings and again recapitulating at least in part with respect to the foregoing, a wick and bearing assembly 201 is adapted for lubricating and rotatable journaling association with shaft 103 of dynamoelectric machine 43 with the wick and bearing assembly comprising wick 173 and bearing 175, as discussed above (FIG. 19). Bearing 175 includes bearing body 45 having bore 51 extending generally axially therethrough and adapted to rotatably journal dynamoelectric machine shaft 103 (FIG. 12). Slot 179 extends through bearing body 45 intersecting with bore 51 along a preselected axial length thereof, and means, such as bridge 181, on the bearing body is passed from the bore for bridging the slot (FIGS. 11–14). Wick 173 comprises means, such as wiping section 183, arranged at least in part in slot 179 so as to extend along the preselected axial length of bore 51 for wiping in lubricant transfer relation with dynamoelectric machine shaft 103 when it is rotatably journaled in the bore, bifurcated means, such as bifurcated sections 183, 185, for opening in a direction away from the bore includes means, such as opening 197 for instance, for releasable engagement with at least a part of the bridge or bridging means 181 to oppose displacement movement of the wiping means or wiping section from the slot into the bore (FIG. 18).

More particularly and with specific reference to FIGS. 11–19, slot 179 has a pair of opposed sidewalls 203, 205 on bearing body 45 which extend generally along the entire axial extent or length thereof so as to intersect with opposite ends 47, 49 of the bearing body and also with bore 51 and at least a part of peripheral portion 55 of bearing 175 spanning across opposed sidewalls 203, 205 of slot 179 radially outwardly of bore 51 thereby to form a stiffening or strengthening rib or the like on the bearing. It may be noted that a portion of bridge 181 extends radially outwardly beyond intermediate surface 67 on peripheral portion 55 of bearing body 45, and preferably the bridge extends axially from marginal surface 69 at least across toroidal surface 57; however, it is contemplated that the bridge may also extend generally axially across at least a part of end surface 63 of the bearing. A pair of opposite abutments or gimbaling surfaces 207, 209 are provided on bridge 181 and are received in axial groove 95 of end shield 79 so as to prevent rotation of bearing 175 when partial toroidal surface 57 thereof is seated on partial spherical surface 81 on the end shield in the generally circular line of engagement 87, as previously discussed.

A wiping surface or portion 211 is provided on wiping section 183 of wick 173 between opposite end portions 189, 191 thereof, and a pair of opposite sidewalls 213, 215 on the wiping section and bifurcated sections 185, 187 of the wick intersect with the opposite end portions and the wiping surface thereof, respectively. When wick 173 is arranged in slot 181 of bearing body 173, as discussed above, a part of side surfaces 213, 215 on the wick are compressed between or otherwise arranged in abutting engagement with opposed sidewalls 203, 205 of the slot, and opposite end portions 189, 191 of the wick extend generally axially away from the slot beyond opposite ends 47, 49 of body 45 of bearing 175. Of course, opening 197 and passage 199 in wick 173 intersect with opposite side surfaces 213, 215 thereof respectively. When wick and bearing assembly 201 is arranged in lubrication and bearing system 171 of dynamoelectric machine 43, as best seen in FIG. 19, partial toroidal surface 57 of bearing 175 is seated on partial spherical surface 81 of end shield 79 in the same manner as previously discussed with respect to bearing 41, and the free ends of fingers 193, 195 on wick 173 extend beyond peripheral portion 53 of bearing 175 into reservoir 131 being disposed in lubricating oil transfer relation with storage wick material 135 therein. Further, opposite end 191 of wick 173 is also arranged in rubbing or lubricating oil transfer relation with thrust plate 139, and abutments 207, 209 are adapted for engagement with confronting parts of axial groove 95 in end shield 79 to prevent rotation of bearing 175 therein in response to the rotation of shaft 103 in bore 51 of the bearing when dynamoelectric machine 43 is energized. It is also contemplated that wick 173 may be impregnated with the aforementioned solid lubricant particles, if desired, so as to operate in lubrication and bearing system 171 in the same manner as previously discussed with respect to wick 73.

Another alternative method of assembling a lubricant impregnable feeder wick 217 with another bearing or bearing device 219 in one form of the invention is illustrated in FIGS. 20–31 with feeder wick 217 and bearing 219, respectively, having generally the same component parts and operating generally in lubrication and bearing system 171 of dynamoelectric machine 43 generally in the same manner as the previously discussed feeder wick 73 and bearing 41 with the exceptions discussed hereinafter. With this alternative method of assembling feeder wick 217 and bearing 219 meets at least some of the objects set out herein, it is believed that such alternative method has indigenous objects as will be in part apparent and in part pointed out in the following discussion.

With reference again to the drawings in regard to the another alternative method and recapitulating at least in part with respect to the foregoing, bearing 219 includes body 45 having opposite ends 47, 49, peripheral portion 55, and bore 51 interposed therebetween, respectively, and a pair of slots or slot means 221, 223 are radially spaced apart generally about the bore so as to extend through the body between the peripheral portion, the bore, and the opposite ends thereof, respectively (FIGS. 20–22). Wick 217 includes a body 225 having a pair of wiping sections 227, 229 with a bridge or connecting section 231 integrally formed therewith and spanning thereacross (FIG. 24). In this alternative method, wiping sections 227, 229 of wick body 225 are disposed, entered or otherwise inserted in or into slots 221, 223 of bearing body 45, respectively, with bridge section 231 twistably displaced between the wiping sections and spanning therebetween across a part of peripheral portion 55 on the bearing body, and forces occasioned by the twisting displacement of the bridge section are imparted to or otherwise effective upon the wiping sections urging at least a part thereof into gripping engagement with a confronting part of the slots so as to at least oppose displacement of the wiping sections from the slots, respectively (FIGS. 25–30).

More particularly and with specific reference to FIGS. 20–30, slots 221, 223 have a pair of opposed sidewalls 233, 235 and 237, 239 formed on body 45 of bearing 219 which intersect with peripheral portion 55, bore 41 and opposite ends 47, 49 thereof, respectively, and the slots also have a pair of opposite end walls 241, 243 interposed between the sidewall pairs and spaced from the opposite ends of the bearing body, respectively. Body 225 of wick 217 has an opening 245 therein between wiping sections 227, 229 adjacent bridge section 231 which defines a pair of opposed end portions 247, 249 on the wiping sections, and another pair of opposite end portions 251, 253 are also provided on the wiping sections, respectively. A pair of wiping surfaces 255, 257 are provided on wiping sections 227, 229 of wick 217 being interposed between end portions 247, 251 and 249, 253 thereof, respectively. In this alternative method of assembling wick 217 and bearing 219, the wick is moved generally toward peripheral portion 55 of bearing body 45, and wiping section 229 is aligned with slot 223. Thereafter and as best seen in FIGS. 25 and 26, end portion 249 on wiping section 229 of wick 217 is led, guided or otherwise passed past opposite end 49 of bearing body 45 between opposed sidewalls 235, 237 of slot 223 with end portion 249 of the wick arranged generally in facing relation with end wall 243 of slot 223 between sidewall pair 235, 237 thereof. Upon the entry of wick 217 into slot 223 of bearing body 45, as discussed above, at least a part of wiping section 229 on the wick is positioned or otherwise disposed in compression between or in abutting engagement with opposite sidewall pair 235, 237 of slot 223 with wiping surface 257 arranged at least adjacent bore 51 of the bearing body, and end portion 249 on wiping section 229 is placed or otherwise associated at least in part generally in abutment with end wall 243 of slot 223. Thereafter and as best seen in FIGS. 27 and 28, bridge section 231 of wick 217 is twisted or otherwise displaced at least in part with respect to wiping section 229 within slot 223 of bearing body 45 while wiping section 227 of the wick is also twisted or otherwise displaced at least in part with respect to the bridge section, and opposed end portions 247, 249 on wiping sections 227, 229 of the wick are spread apart while opposed end portion 249 is at least in part abutted with end wall 243 of the bearing body. When bridge section 231 and wiping section 227 of wick 217 are so twisted, wiping section 227 may be aligned or otherwise located with respect to slot 221 in bearing body 45 adjacent peripheral portion 55 thereof. From its aligned position adjacent peripheral portion 55 of bearing body 45, wiping section 227 of wick 217 is inserted or otherwise entered into slot 221 in the bearing body between opposed sidewall pair 223, 235 thereof with opposed end portion 247 on wiping section 237 being arranged or otherwise disposed at least in part in facing relation with end wall 241 of slot 221. With wiping section 227 of wick 217 at least in part entered into slot 221 of bearing body 45, as discussed above, the wiping section may be pushed or otherwise forced farther into the slot into an assembly position therewith abutting opposed end portion 247 on the wiping section with end wall 241 of slot 221. Thus, it may be noted that the twisting displacement of bridge section 231 applies forces on wiping sections 227, 229 of wick 217 when the wiping sections are contained or otherwise captured within slots 221, 223 of bearing body 45 so as to urge at least a part of each wiping section into gripping engagement with a confronting part of sidewall pairs 235, 237 and 239, 241 of slots 221, 223, respectively, in order to oppose displacement of the wiping sections from the slots. While wiping section 229 of wick 217 has been illustrated and discussed herein as being entered into slot 223 of bearing 219 to initiate the assembling method as discussed above, it is, of course, contemplated that such assembling method could be reversed with wiping section 227 of the wick being first entered into slot 221 of the bearing within the scope of the invention so as to meet at least some of the objects thereof.

Referring again in general to the drawings and recapitulating at least in part with respect to the foregoing, there is illustrated another wick and bearing assembly 259 for shaft 103 of dynamoelectric machine 43 with the wick and bearing assembly comprising wick 217 and bearing 219 (FIG. 31). Wick 217 includes wiping sections 227, 229 with a displaceable intermediate or midsection, such as bridge 231, integrally formed therebetween (FIG. 24). Bearing 219 has opposite ends 47, 49, and means, such as bore 51, extending generally axially through the bearing intersecting with the opposite ends thereof is adapted for journaling dynamoelectric machine shaft 103 (FIG. 20). A pair of means, such as slots 221, 223, are generally radially spaced apart from each other about bore 51 and intersect therewith and with opposite end portions 47, 49 for receiving in releasable engagement therein wiping sections 227, 229 of wick 217 upon the displacement or twisting of bridge section 231 thereof with respect to the wiping sections, respectively (FIGS. 27, 28). Wick 217 further includes means, such as opening 245 for instance, extending therethrough adjacent bridge section 231 and between wiping sections 227, 229 for bridging or spanning across bearing 219 exteriorly thereof between slots or receiving means 221, 223 when the wiping sections of the wick are releasably engaged therein, respectively (FIGS. 29 and 30).

More particularly and with specific reference to FIGS. 3 and 21-31, a bridge or bridging means 261 is integrally formed on peripheral portion 55 of bearing 219 being generally arranged at least in part between end walls 241, 243 of slots 221, 223 and inluding a pair of opposite abutments or gimbaling surfaces 263, 265 which extend generally axially or lengthwise from partial toroidal surface 57 of the bearing to opposite end 47 thereof. Of course, gimbaling surfaces 263, 265 are received in rotation preventing and/or gimbaling engagement with groove 95 in end shield 79 to effect proper alignment of bearing 219 in dynamoelectric machine 43 when shaft 103 is journaled in bore 51 of the bearing, as discussed hereinbefore with respect to bearing 41 and as best seen in FIG. 31.

From the foregoing, it is now apparent that novel methods of assembling a wick and bearing are presented meeting the objects and advantageous features set out hereinbefore, as well as others, and that changes as to the precise arrangements, shapes, connections and details of the constructions and also the precise order of the method steps illustrated herein by way of example for purposes of disclosure may be made by those having ordinary skill in the art without departing from the spirit of the invention or the scope thereof as defined by the claims which follow.

What I claim as new and desire to secure by Letters Patent of the United States is:

1. A method of assembling a unitary lubricant impregnable wick and a bearing, the bearing including a body having a pair of opposite ends with a peripheral portion interposed therebetween, a bore extending generally axially through the body intersecting with the opposite ends thereof, slot means extending generally radially through the body intersecting with the opposite ends and the bore along the entire axial length thereof, and a bridge means on the body between the opposite ends and spaced radially outwardly of the bore for spanning the slot means, the wick including a generally axially extending wiping section having a pair of opposite end portions thereon, a pair of spreadable fingers disposed generally in side-by-side relation and extending generally perpendicular to the wiping section between the opposite end portions, an opening through the wick, and a passage between the fingers and intersecting with the opening, the method comprising the steps of:

spreading apart the fingers of the wick;

opening the passage between the fingers upon the spreading apart thereof;

aligning the opened passage generally with the slot means adjacent one of the opposite ends of the bearing body;

moving the opened passage into the slot means toward the bridge means from the one opposite end of the bearing body;

entering one of the fingers and one of the opposite end portions of the wiping section of the wick through the one opposite end of the bearing body into the bore thereof and passing the other of the fingers adjacent the peripheral surface of the bearing body and at least in part over the bridge means generally during the moving step;

guiding the one finger from the bore into the slot means between the other end of the bearing body and the bridge means;

turning the wick at least in part in the slot means generally about the bridge means to dispose the opening in the wick at least in part adjacent the bridge means and to locate the wiping section in the slot means with the opposite end portions of the wiping sections extending through the slot means axially beyond the opposite ends of the bearing body and returning the fingers at least in part toward the side-by-side relation thereof beyond the peripheral surface of the bearing body so as to generally close the passage between the fingers and capture within the opening in releasable engagement therewith at least a part of the bridge means.

2. A method of assembling a unitary lubricant impregnable wick with a bearing, the bearing including a body having a sidewall defining a bore extending generally axially through the bearing body, slot means through the sidewall for intersecting with the bore along the axial extent thereof, and bridge means on the sidewall for spanning the slot means, the wick including a wiping section, and a pair of bifurcated sections disposed in angular and spaced relation with respect to the wiping section, the method comprising the steps of:

passing the wick toward the bridging means through the slot means generally adjacent one end of the bore and extending a part of the wiping section and one of the bifurcated sections into the bore; and moving the one bifurcated section generally about the bridging means through the slot means generally adjacent the other end of the bore and capturing the bridge means in releasable engagement between the bifurcated sections with the bifurcated sections being located at least in part beyond the sidewall of the bearing body generally adjacent each other and with the wiping section being positioned at least in part within the slot means adjacent the bore.

3. The method as set forth in claim 2 wherein the passing and extending step includes locating the other of the bifurcated sections at least adjacent the bridge means and positioning another part of the wiping section at least in part within the slot means generally adjacent the one end of the bore.

4. The method as set forth in claim 2 wherein the bifurcated sections define an opening therebetween through the wick and wherein the moving and capturing step includes receiving the bridge means in the releasable engagement between the bifurcated sections within the opening.

5. The method as set forth in claim 2 wherein the wiping section has a pair of opposite end portions and wherein the moving and capturing step includes extending the at least one of the opposite end portions through the slot means generally axially beyond one of the one end and the other end of the bore.

6. The method as set forth in claim 2 wherein the passing and extending step includes positioning another part of the wiping section and the other of the bifurcated sections beyond the sidewall of the bearing body generally when the wick is passed toward the bridge means through the slot means adjacent the one end of the bore.

7. The method as set forth in claim 6 wherein the moving and capturing step includes inserting the first named and another wiping section parts into the slot means in directions from within the bore and beyond the sidewall, respectively, and extending the other bifurcated section at least adjacent the bridge means at least in part through the slot means and beyond the sidewall.

8. A method of assembling a lubricant impregnable wick with a bearing, the bearing including a body having a sidewall defining a bore extending generally axially through the bearing body, slot means through the sidewall for intersecting with the bore along the axial extent thereof, and bridge means on the sidewall for spanning the slot means, the wick including a wiping section, and a pair of bifurcated sections disposed in angular and spaced relation with respect to the wiping section, the method comprising the steps of:

passing the wick at least in part into the bore through an end thereof;

aligning the bifurcated sections generally on opposite sides of the bridging means;

moving at least a part of the bifurcated sections through the slot means so as to extend beyond the sidewall of the bearing body and capturing the bridge means in releasable engagement between the bifurcated sections.

9. The method as set forth in claim 8 wherein the moving and capturing step includes displacing at least one of the bifurcated sections so as to dispose the bridge means between the bifurcated sections.

10. The method as set forth in claim 9 wherein the moving and capturing step further includes engaging the bridge means and at least the at least one bifurcated section to effect the displacement thereof.

11. The method as set forth in claim 8 wherein the bifurcated sections define at least in part an opening therebetween through the wick and wherein the moving and capturing step includes positioning the bridge means at least in part within the opening in the releasable engagement with the bifurcated sections.

12. A method of assembling a unitary lubricant impregnable wick and a bearing, the bearing including a body having a pair of opposite ends with a peripheral portion interposed therebetween, a bore extending generally axially through the bearing body generally in radially spaced apart relation with the peripheral portion and intersecting with the opposite ends of the bearing body, respectively, a pair of generally axially extending slots in the bearing body and generally radially spaced apart from each other about the bore, the slots having a pair of opposed sidewalls intersecting with the peripheral portion, the bore and the opposite ends of the bearing body and also having a pair of end walls interposed between the opposed sidewall pairs and spaced from the opposite ends of the bearing body, respectively, the wick including another body having a pair of generally axially aligned and spaced apart wiping sections with a bridge section integrally connected across the wiping sections, an opening through the wick body between the wiping sections and adjacent the bridge section and defining a pair of opposed end portions on the wiping sections, respectively, a pair of opposite end portions on the wiping sections, respectively, and a pair of wiping surfaces on the wiping sections interposed between the opposed end portion pair and the opposite end portion pair thereof, respectively, the method comprising the steps of:

moving the wick generally toward at least a part of the peripheral portion of the bearing body;

aligning one of the wiping sections on the wick body generally with one of the slots in the bearing body;

leading one of the opposed end portions on the one wiping section past one of the opposite ends on the bearing body between one of the opposed sidewall pair of the one slot with the one opposed end portion arranged generally in facing relation with one of the opposite end walls between the one sidewall pair of the one slot in the bearing body;

positioning at least a part of the one wiping section on the wick body in engagement with the one opposite sidewall pair of the one slot in the bearing body with one of the wiping surfaces on the one wiping section arranged at least adjacent the bore of the bearing body and placing the one opposed end portion on the one wiping section at least in part generally in abutment with the one opposite end wall of the one slot in the bearing body;

twisting the bridge section of the wick body at least in part with respect to the one wiping section thereof in the one slot of the bearing body and the other of the wiping section of the wick body at least in part with respect to the bridge section thereof and spreading apart the opposed end portions on the wiping sections of the wick body;

aligning the other wiping section on the wick body generally with the other of the slots in the bearing body;

inserting adjacent parts of the other of the opposed end portions and the other of the wiping surfaces on the other wiping section generally in a direction from the peripheral portion of the bearing body into the other slot between the other of the opposed sidewall pair thereof with the part of the other opposed end portion on the wick body arranged generally in facing relation with the other of the opposite sidewalls between the other sidewall pair of the other slot in the bearing body; and pushing the other wiping section on the wick body farther into the other slot in the bearing body and abutting the other opposed end portions on the other wiping section with the other opposite end wall of the other slot in the bearing body.

13. A method of assembling a unitary lubricant impregnable wick and a bearing, the bearing including a body having a pair of opposite ends with a peripheral portion interposed therebetween, a bore in the bearing body spaced from the peripheral portion and intersecting with the opposite ends, respectively, a pair of slots radially spaced apart from each other generally about the bore and extending through the bearing body between the peripheral portion, the bore and the opposite ends thereof, respectively, the wick including a generally flat body formed of a generally resiliently displaceable material and having a pair of spaced apart wiping sections with a bridge section integrally interconnected across the wiping sections, the method comprising the steps of:

containing one of the wiping sections of the wick body within one of the slots in the bearing body;

twisting the bridge section and the other of the wiping sections of the wick body generally about the one wiping section thereof contained in the one slot of the bearing body; and entering the other of the wiping sections of the wick body into the other of the slots in the bearing body with the twisted bridge section of the wick body spanning across the peripheral portion of the bearing body between the slots thereof.

14. A method of assembling a unitary lubricant impregnable wick and a bearing, the bearing including a body having a pair of opposite end portions with a generally radially spaced peripheral portion and a journaling surface interposed therebetween, respectively, and a pair of slots radially spaced apart generally about the journaling surface and extending through the bearing body between the peripheral portion, the journaling surface and the opposite ends thereof, respectively, the wick including a body having a pair of wiping sections with a bridge section spanning thereacross, the method compising disposing the wiping sections of the wick body in the slots of the bearing body, respectively, with the bridge section twistably displaced between the wiping sections and spanning therebetween across a part of the peripheral portion of the bearing body and imparting forces occasioned by the twisting displacement of the bridge sections onto the wiping sections urging at least a part thereof into gripping engagement with a confronting part of the slots so as to at least oppose displacement of the wiping sections from the slots, respectively.

* * * * *